Feb. 9, 1932.  O. R. MITCHELL  1,844,134
SLACK ADJUSTER
Filed Sept. 26, 1928
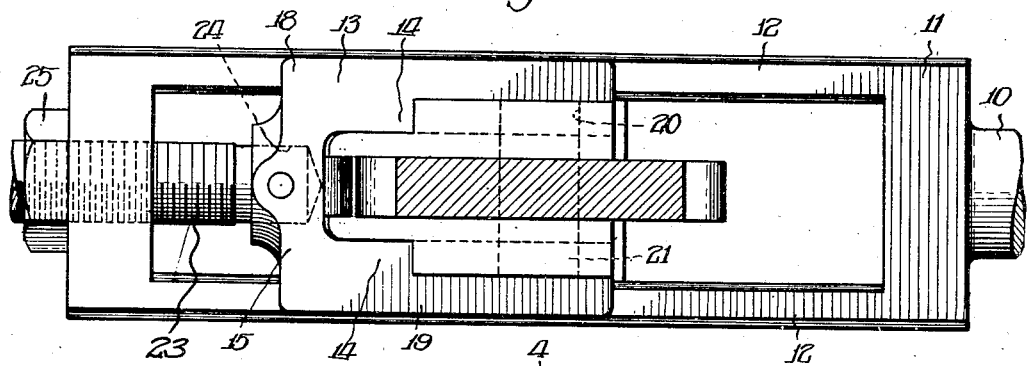
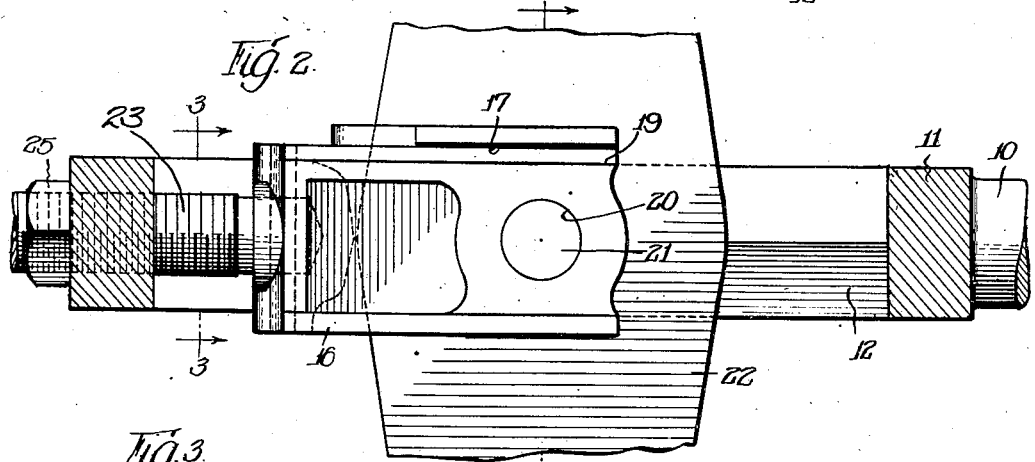
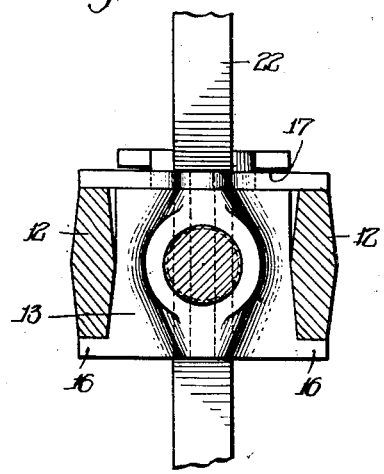
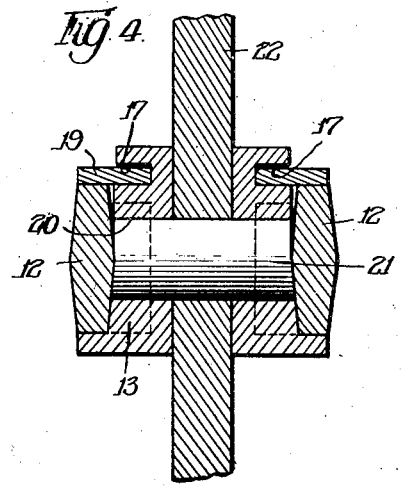
Inventor
Ormah R. Mitchell Patented Feb. 9, 1932

1,844,134

UNITED STATES PATENT OFFICE

ORMAH R. MITCHELL, OF CHICAGO, ILLINOIS, ASSIGNOR TO AMERICAN STEEL FOUNDRIES, OF CHICAGO, ILLINOIS, A CORPORATION OF NEW JERSEY

SLACK ADJUSTER

Application filed September 26, 1928. Serial No. 308,484.

This invention relates to slack adjusters, and more particularly to a slack adjuster arrangement which is adapted for use in connection with railway car brakes.

One object of the invention is to provide a slack adjuster arrangement in which the parts may be easily and quickly assembled and disassembled without distorting any of the parts.

Another object is to provide a simple, durable and reliable slack adjuster arrangement which will facilitate repairing slack adjusters in the event that such becomes necessary.

Another object is to provide a slack adjuster arrangement in which the parts are arranged to cooperate in a manner to meet all of the requirements for the intended use.

These and other objects are accomplished by means of the arrangement disclosed on the accompanying sheet of drawings, in which—

Figure 1 is a top plan view, the brake lever being shown in section, of a slack adjuster embodying my invention;

Figure 2 is a fragmentary side elevation of the same arrangement, the frame being shown in section;

Figure 3 is a sectional view taken in the plane of line 3—3 of Figure 2; and

Figure 4 is a sectional view taken in the plane of line 4—4 of Figure 2.

The various novel features of the invention will be apparent from the following description and drawings and will be particularly pointed out in the appended claims.

In certain types of brake slack adjusters, it is necessary to heat and distort the sides of the frame member to insert the integral fulcrum block. This is objectionable. To avoid this undesirable operation, I have provided fulcrum means in the form of a plurality of interlocking parts which are assembled or disassembled in whole or in part within the frame and which are adjustable as a unit in said frame.

Referring to the figures of the drawings, it will be noted that the slack adjuster is mounted at one end of a brake rod 10 having an open rectangular frame 11 with sides 12. The fulcrum means includes a U-shaped block 13 having spaced arms 14 and a head 15, all of which are mounted within the frame 11. The lower portion of the block 13 is provided with laterally extending projections 16 which slidably engage the under surfaces of the sides of the frame 11. The block 13 is also provided with oppositely arranged undercut grooves 17 adjacent the upper portions of the sides 12 of the frame 11.

To interlock the block 13 with the frame 11, a U-shaped yoke 18 is provided having longitudinally extending arms 19 which are received by the grooves 17. The laterally extending projections 16 and the arms 19 respectively form the lower and upper guides for the movable element of the slack adjuster in slidably engaging the lower and upper surfaces of the sides 12 of the frame 11. The arms 14 of the block 13 near one end are provided with bearing openings 20 for the reception of a lever fulcrum pin 21 which also passes through the brake lever 22.

In assembling the parts, the brake lever 22 is first placed between the arms 14 of the block 13 and the brake lever fulcrum pin 21 set in place. Then the block 13 with the brake lever and pin in position is placed in the frame 11 either by raising said parts with respect to the frame or lowering the frame upon said parts. Then the U-shaped locking member 18 is set in position by sliding the arms 19 thereof into the grooves 17 of the block 13. Said parts, as a unit, may then be moved into position with respect to the slack adjuster screw 23, and a pin driven through openings in the lever carrying block 13, the guide yoke 18 and a screw 23, the latter having one end thereof positioned within a recess or pocket 24 in the head of the block 13.

Mounted upon the outer end of the screw 23 is a nut 25 by means of which the adjusting screw 21 and accordingly the lever fulcrum means may be adjusted longitudinally within the frame for varying slack conditions in the brake system.

By means of the arrangement herein disclosed, the various objects of the invention are accomplished.

It is my intention to cover all modifications of the invention falling within the spirit and scope of the appended claims.

I claim:

1. In a brake slack adjuster, the combination of a frame, and brake lever fulcrum means adjustably mounted therein and comprising a lever carrying member having projections for movably engaging a portion of said frame, and a member interlocking said lever carrying member and another portion of said frame.

2. In a brake slack adjuster, the combination of a frame, and brake lever fulcrum means adjustably mounted therein and comprising a lever carrying member having a projection for movably engaging a portion of said frame, and a member interlocking said lever carrying member and a different portion of said frame and movably engaging the latter.

3. In a brake slack adjuster, the combination of a frame, and brake lever fulcrum means adjustably mounted therein and comprising a lever carrying member having a projection for slidably engaging a portion of said frame, and a member releasably interlocking said lever carrying member and a different portion of said frame and having a portion slidably engaging said frame.

4. In a brake slack adjuster, the combination of a frame, and brake lever fulcrum means adjustably mounted therein and comprising a lever carrying member having oppositely extending projections movably engaging a portion of said frame, and a member interlocking said lever carrying member and a different portion of said frame and having portions movably engaging the latter.

5. In a brake slack adjuster, the combination of a frame, and brake lever fulcrum means adjustably mounted therein and comprising a lever carrying member having projections for slidably engaging a portion of said frame, and a member releasably interlocking said lever carrying member and a different portion of said frame and slidably engaging the latter.

6. In a brake slack adjuster, the combination of a frame, and brake lever fulcrum means adjustably mounted therein and comprising a lever carrying member having laterally extending projections slidably engaging said frame and having oppositely arranged grooves, and means fitting into said grooves and slidably engaging said frame whereby said lever fulcrum means as a unit is adjustable in said frame.

7. In a brake slack adjuster, the combination of a frame, and brake lever fulcrum means adjustably mounted therein and comprising a lever carrying member having laterally extending projections slidably engaging said frame and having oppositely arranged grooves, and a U-shaped member fitting into said grooves and slidably engaging said frame whereby said lever fulcrum means as a unit is adjustable in said frame.

8. In a brake slack adjuster, the combination of a frame, and brake lever fulcrum means adjustably mounted therein and comprising a lever carrying member having laterally extending projections slidably engaging said frame and having oppositely arranged grooves, means fitting into said grooves and slidably engaging said frame whereby said lever fulcrum means as a unit is adjustable in said frame, and means for securing said lever carrying member and said last mentioned means to a slack adjuster screw.

9. In a brake slack adjuster, brake lever fulcrum means comprising a lever carrying member having a portion adapted to slidably engage a slack adjuster frame and also having a groove, and means mounted in said groove and adapted to engage the said frame for releasably and slidably locking the parts with respect thereto.

10. In a brake slack adjuster, brake lever fulcrum means comprising a lever carrying block having a guiding portion and a groove, and means fitting into said groove and also acting as a guiding element.

11. In a brake slack adjuster, brake lever fulcrum means comprising a lever carrying block having oppositely arranged guiding projections and oppositely arranged grooves, and means fitting into said grooves and having cooperating guiding means.

12. In a brake slack adjuster, brake lever fulcrum means comprising a lever carrying block having oppositely arranged guiding projections and oppositely arranged grooves, and a U-shaped member fitting into said grooves and having cooperating guiding means.

Signed at Chicago, Illinois, this 21st day of September, 1928.

ORMAH R. MITCHELL.